(12) United States Patent
Platner et al.

(10) Patent No.: US 12,554,180 B2
(45) Date of Patent: Feb. 17, 2026

(54) OPTICAL MODULE ISOLATION IN IMAGE CAPTURE DEVICES

(71) Applicant: GoPro, Inc., San Mateo, CA (US)

(72) Inventors: David Thomas Platner, San Francisco, CA (US); Ian Copeland Griggs, San Francisco, CA (US); Jonathan Stern, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 189 days.

(21) Appl. No.: 18/379,117

(22) Filed: Oct. 11, 2023

(65) Prior Publication Data

US 2024/0126146 A1    Apr. 18, 2024

Related U.S. Application Data

(60) Provisional application No. 63/415,675, filed on Oct. 13, 2022.

(51) Int. Cl.
    *G03B 17/12*    (2021.01)
(52) U.S. Cl.
    CPC ........ *G03B 17/12* (2013.01); *G03B 2217/002* (2013.01)

(58) Field of Classification Search
    CPC ... G03B 17/12; G03B 2217/002; G03B 17/02
    See application file for complete search history.

(56) References Cited

U.S. PATENT DOCUMENTS

| | | | |
|---|---|---|---|
| 2019/0085931 A1* | 3/2019 | Graham | G02B 7/021 |
| 2021/0329170 A1* | 10/2021 | Osaka | H04N 23/55 |
| 2022/0091363 A1* | 3/2022 | Kang | G02B 7/102 |

FOREIGN PATENT DOCUMENTS

| | | | | |
|---|---|---|---|---|
| CN | 103649827 A | * | 3/2014 | G03B 5/02 |
| KR | 101834953 B1 | * | 3/2018 | H04N 23/51 |
| WO | WO-2009096664 A1 | * | 8/2009 | G03B 17/02 |

* cited by examiner

*Primary Examiner* — Christopher E Mahoney
(74) *Attorney, Agent, or Firm* — Young Basile Hanlon & MacFarlane, P.C.

(57) ABSTRACT

An image capture device is disclosed that includes: a body; an optical module that is positioned within the body and which defines an optical axis; and an isolation assembly that supports (suspends) the optical module within the body and which facilitates resilient displacement of the optical module in relation to the body upon the application of an external force to the image capture device to thereby inhibit transmission of the external force to the optical module.

20 Claims, 9 Drawing Sheets

OPTICAL MODULE ISOLATION IN IMAGE CAPTURE DEVICES

CROSS-REFERENCE TO RELATED APPLICATION(S)

This application claims the benefit of and priority to U.S. Provisional Patent Application No. 63/415,675, filed Oct. 13, 2022, the entire disclosure of which is hereby incorporated by reference.

TECHNICAL FIELD

The present disclosure relates to optical modules in image capture devices. More specifically, the present disclosure relates to the isolation of optical modules to facilitate the absorption and dissipation of external force(s) that are applied to the image capture device.

BACKGROUND

Image capture devices are used in a variety of applications, including, for example, handheld cameras and video recorders, cell phones, drones, vehicles, etc. Image capture devices typically include an optical module with one or more optical elements (e.g., lens elements), which capture content by receiving and focusing light, and one or more image sensors, which convert the captured content into an electronic image signal that is processed by an image signal processor to form an image. In some image capture devices, the optical element(s) and the image sensor(s) are combined into a single unit, which is known as an integrated sensor-lens assembly (ISLA).

Optical modules include a variety of sensitive components (e.g., the lens element(s), the image sensor(s), one or more printed circuit boards (PCBs), etc.) that are susceptible to dislocation and/or damage upon the application of external force(s) to the image capture device (e.g., in the event that the image capture device is dropped, struck by an object, etc.). Such susceptibility presents opportunities for improvements in design and packaging.

The present disclosure addresses these opportunities by providing an isolation assembly that allows for movement of the optical module within the image capture device, which protects the optical module by facilitating the absorption and dissipation of external force(s) that are applied to the image capture device.

SUMMARY

In one aspect of the present disclosure, an image capture device is disclosed that includes: a body; an optical module that is positioned within the body and which defines an optical axis; and an isolation assembly that supports the optical module within the body and which facilitates resilient displacement of the optical module in relation to the body upon the application of an external force to the image capture device to thereby inhibit transmission of the external force to the optical module.

In certain embodiments, the isolation assembly may include a damper (stabilizer) that is configured to dissipate energy released by the isolation assembly and reduce oscillation of the optical module within the body.

In certain embodiments, the optical module may include at least one actuator that is configured to facilitate repositioning of one or more components thereof independently of the external force and thereby reconfigure the optical module.

In certain embodiments, the optical module may include a single lens assembly.

In certain embodiments, the optical module may include a first lens assembly and a second lens assembly that is spaced axially from the first lens assembly along the optical axis.

In certain embodiments, the first lens assembly and the second lens assembly may be dependently supported by the isolation assembly.

In certain embodiments, the first lens assembly and the second lens assembly may be fixedly connected such that the first lens assembly and the second lens assembly are displaced simultaneously within the body upon the application of the external force.

In certain embodiments, the image capture device may further include a mounting member that extends between and fixedly connects the first lens assembly and the second lens assembly.

In certain embodiments, the isolation assembly may be connected to the mounting member.

In certain embodiments, the first lens assembly and the second lens assembly may be independently supported by the isolation assembly.

In certain embodiments, the first lens assembly and the second lens assembly may be movable in relation to each other and the body upon the application of the external force.

In another aspect of the present disclosure, an image capture device is disclosed that includes: a body; an optical module that is positioned within the body; and at least one compliant member that extends between the body and the optical module to thereby isolate the optical module from the body and absorb external force(s) that are applied to the image capture device.

In certain embodiments, the at least one compliant member may be resilient in construction such that the optical module is repositionable between a normal position and a deflected position upon the application of the external force(s).

In certain embodiments, the at least one compliant member may be configured as a spring.

In certain embodiments, the at least one compliant member may be uniformly compliant in each direction.

In certain embodiments, the at least one compliant member may be configured such that compliance in a first direction exceeds compliance in a second direction.

In another aspect of the present disclosure, a method is disclosed for reducing force transmission to an optical module in an image capture device. The method includes operatively connecting the optical module to a body of the image capture device via an isolation assembly such that the optical module is movable in relation to the body upon the application of external force(s) to the image capture device.

In certain embodiments, operatively connecting the optical module to the body of the image capture device may include supporting a single lens assembly via at least one compliant member that extends between the optical module and the body.

In certain embodiments, operatively connecting the optical module to the body of the image capture device may include dependently supporting first and second lens assemblies via at least one compliant member that extends between the optical module and the body.

In certain embodiments, operatively connecting the optical module to the body of the image capture device may include independently supporting first and second lens assemblies via at least one compliant member that extends between the optical module and the body.

In certain embodiments, the method may further include damping the isolation assembly to thereby reduce oscillation of the optical module within the body.

BRIEF DESCRIPTION OF THE DRAWINGS

The present disclosure is best understood from the following detailed description when read in conjunction with the accompanying drawings. According to common practice, the various features of the drawings may not be to-scale, and the dimensions of the various features may be arbitrarily expanded or reduced. Additionally, in the interest of clarity, certain components, elements, and/or features may be omitted from certain drawings in the interest of clarity.

DETAILED DESCRIPTION

The present disclosure describes various embodiments of optical modules and isolation assemblies for use in an image capture device. While generally illustrated and described in connection with a (digital) camera, the principles and components described herein may find wide applicability to a broad range of image capture devices including, for example, those that are configured for use in mobile devices (e.g., cell phones, tablets, laptops etc.), vehicles, security apparel (e.g., vests), etc.

The presently disclosed isolation assemblies support (suspend) the corresponding optical modules, and allow for movement thereof, within the image capture device. The isolation assemblies include one or more compliant members (and/or materials) and mechanically isolate the optical modules from the remainder of the image capture device, which protects the optical modules by facilitating the absorption and dissipation of applied external force(s) (e.g., in the event that the image capture device is dropped, struck by an object, etc.). For example, mechanically isolating the optical modules inhibits (if not entirely prevents) shifting (dislocation) of the lens element(s), maintains the connection between the PCB and the ISLA, maintains the connection between the PCB and the image sensor, etc.

The principles and components described herein are applicable to a wide variety of optical modules and ISLAs including single and multiple lens assemblies, dampers (stabilizers) that are configured to reduce oscillation of the optical module, and actuators that support reconfiguration of the optical module, as discussed in detail below.

Figure 1A:
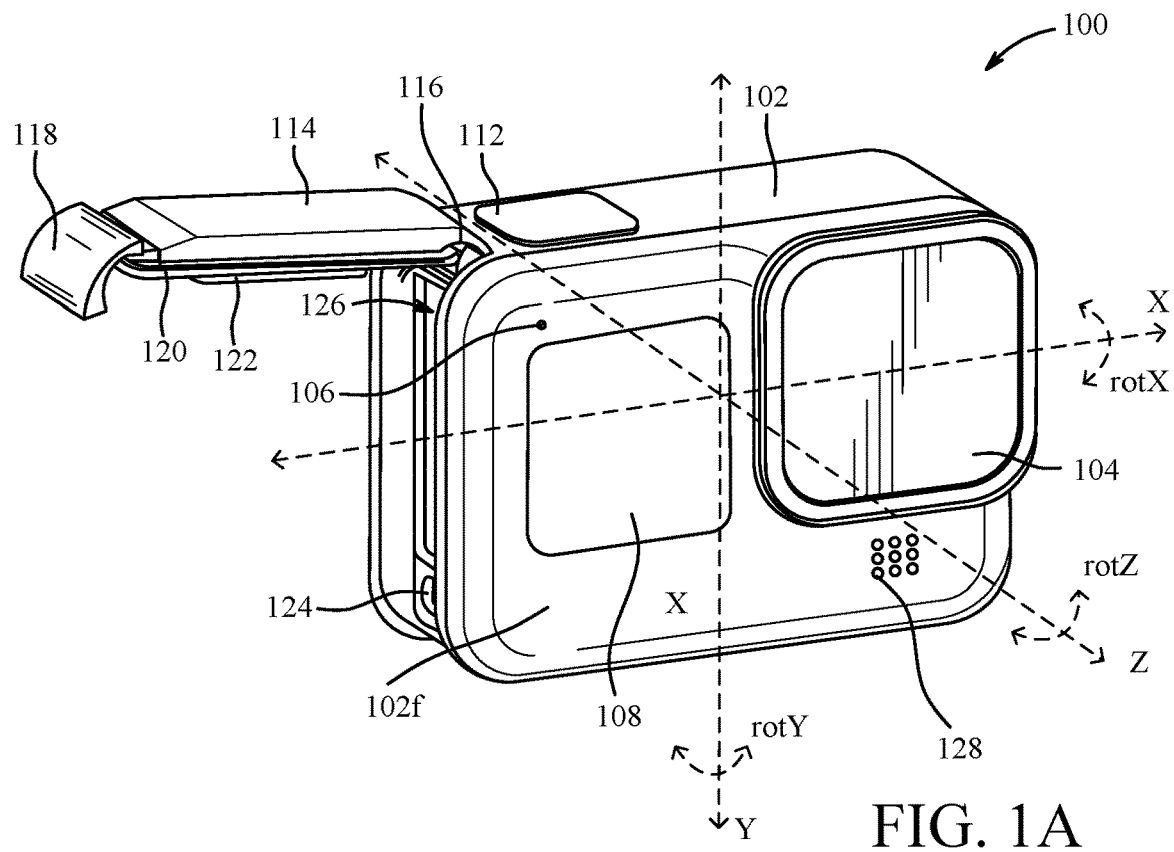
FIGS. 1A-B are isometric views of an example of an image capture device.
Figure 1B:
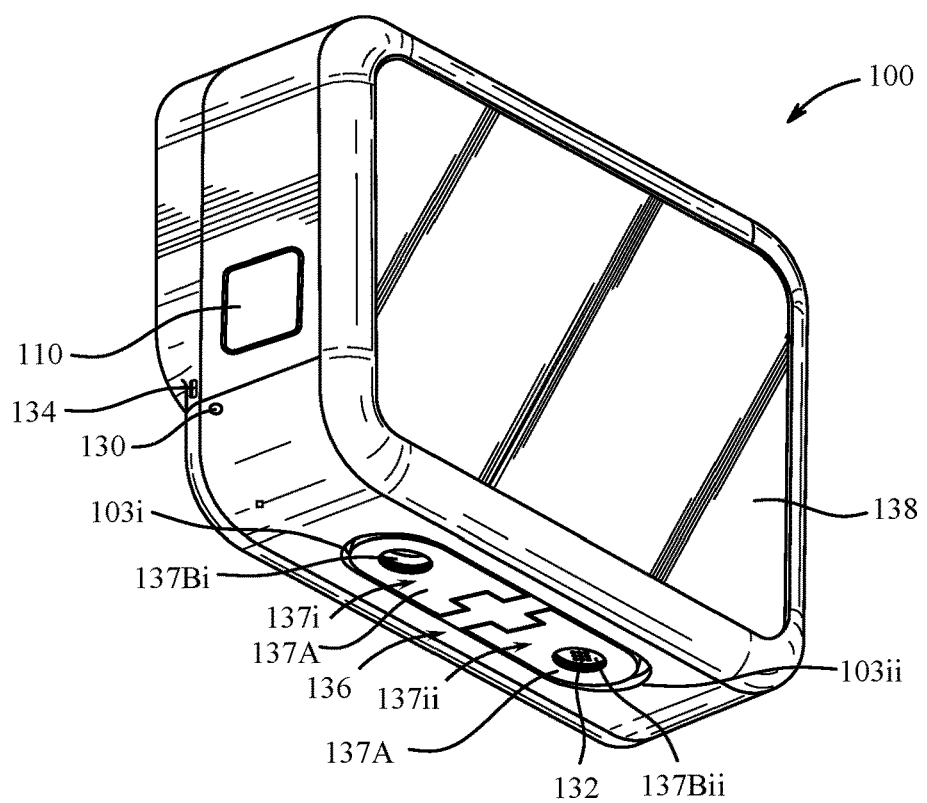

FIGS. 1A-B are isometric views of an example of an image capture device 100. The image capture device 100 may include a body 102, one or more lenses (e.g., lens elements) 104 structured on a front surface 102$f$ of the body 102, various indicators on the front surface 102$f$ of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens(es) 104 and/or performing other functions. The lens(es) 104 receive light incident upon the lens(es) 104 and to direct received light onto an image sensor internal to the body 102, as described in further detail below. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on the front surface 102f and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

The front surface 102f of the image capture device 100 may include a drainage channel 134. A bottom surface of the image capture device 100 may include a (first) interconnect mechanism 136 that is configured for engagement with (connecting to) an accessory, handle, grip, etc., such that the image capture device 100 is (repeatably) connectable to the accessory via the interconnect mechanism 136. In the example shown in FIG. 1B, the interconnect mechanism 136 includes folding protrusions 137 (e.g., fingers 137A) that are configured to move between a nested (collapsed) position (FIG. 1B) and an extended (open) position (FIGS. 2A, 2B) that facilitates coupling of the protrusions 137 to mating protrusions of other devices such as accessories, handle grips, mounts, clips, or like devices, as discussed in further detail below. More specifically, the interconnect mechanism 136 includes a (first) protrusion 137i defining a (first) opening 137Bi and a (second) protrusion 137ii defining a (second) opening 137Bii, which are moveable between the nested and extended positions independently of each other. As seen in FIG. 1B, for example, when the protrusions 137 are in the nested position, the protrusions 137 are received within (accommodated by) corresponding cavities 103, which extend (vertically upward) into the body 102 (e.g., towards the shutter button 112), and when the protrusions 137 are in the extended position, the protrusions 137 are removed from the cavities 103 such that the protrusions 137 extend (vertically downward) from the body (e.g., away from the shutter button 112). More specifically, the body 102 includes a (first) cavity 103i that is configured to receive the protrusion 137i when the protrusion 137i is in the nested position and a (second) cavity 103ii that is configured to receive the protrusion 137ii when the protrusion 137ii is in the nested position. To facilitate reception of the protrusions 137, the cavities 103 include identical (or generally identical) configurations, which correspond to those defined by the protrusions 137. As such, in the illustrated embodiment, the cavities 103 each include a D-shaped (or generally D-shaped) transverse (e.g., horizontal) cross-sectional configuration. It should be appreciated, however, that the particular configurations of the protrusions 137 and the cavities 103 may be altered in various embodiments without departing from the scope of the present disclosure.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
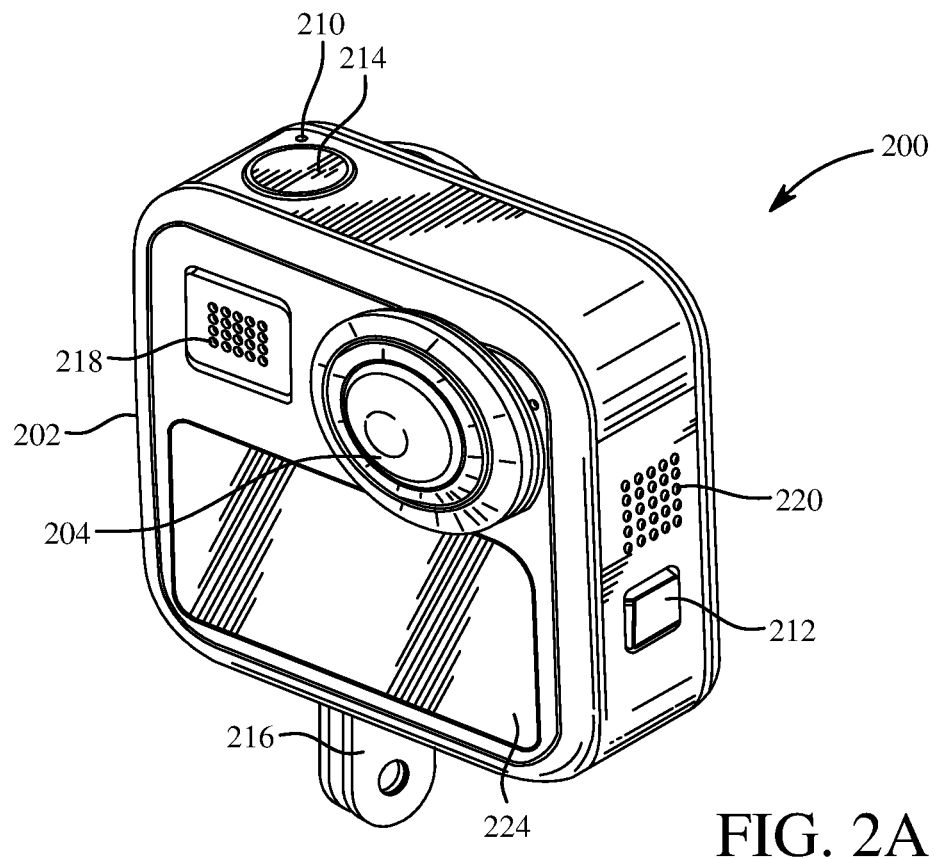
FIGS. 2A-B are isometric views of another example of an image capture device.
Figure 2B:
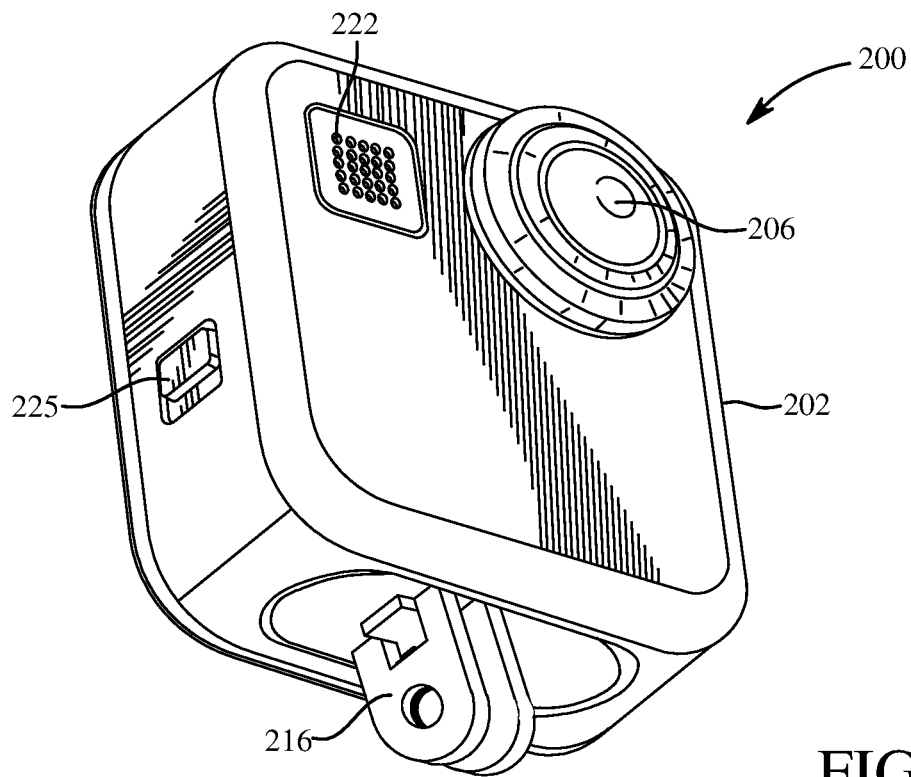

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
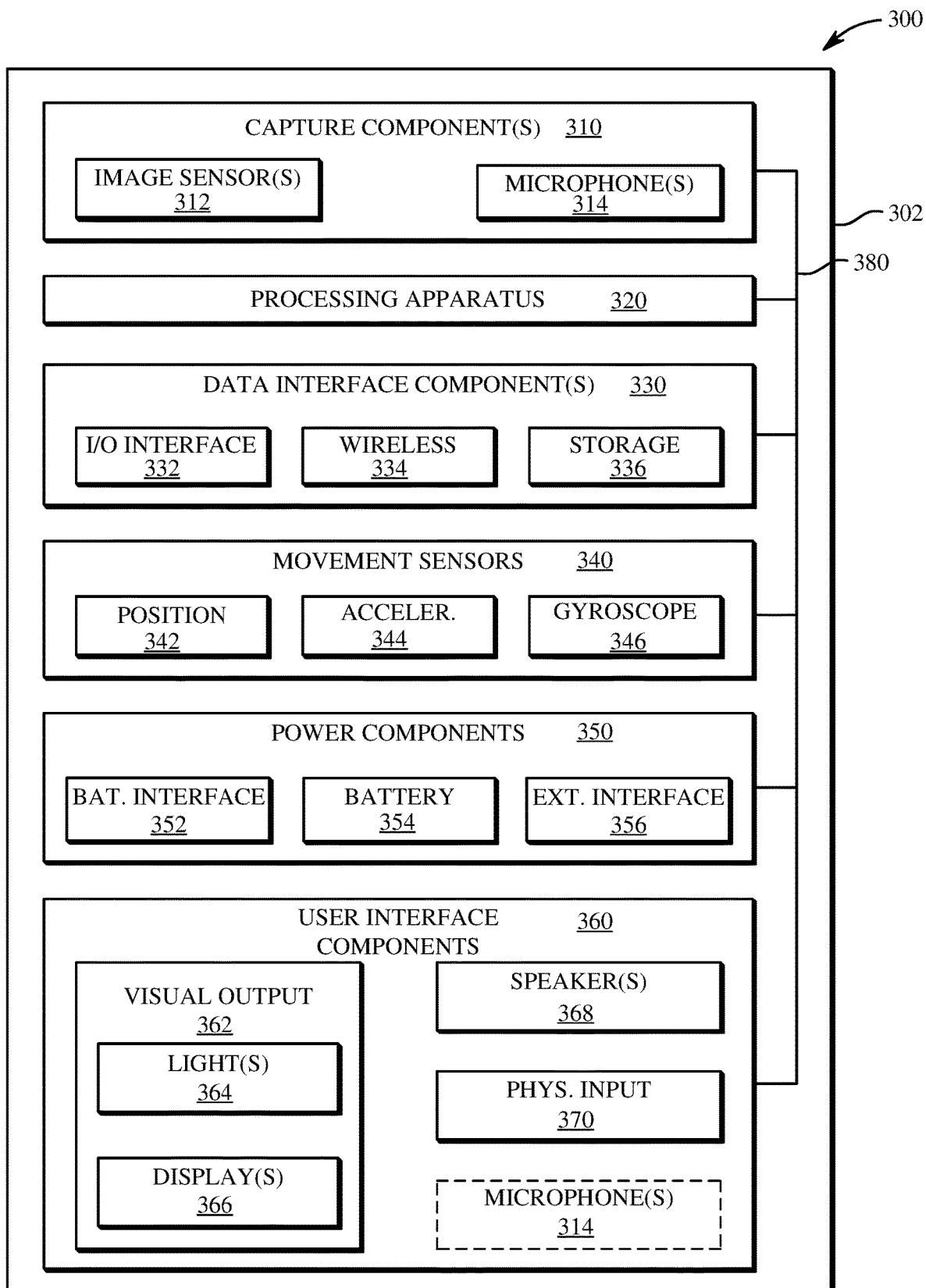
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor-lens assemblies. The description of the image capture device 300 is also applicable to the image capture devices 100, 200 of FIGS. 1A-B, 2A, and 2B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300.

The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or one or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
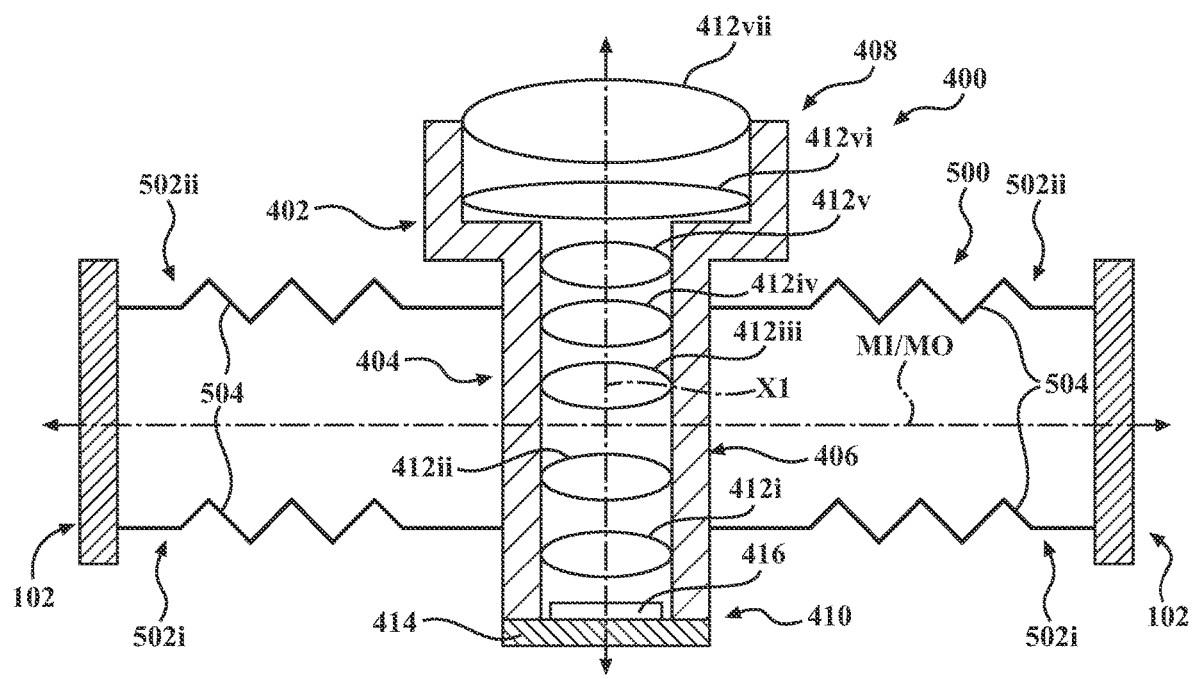
FIG. 4 is a schematic, cross-sectional view of an optical module and an isolation assembly according to one embodiment of the present disclosure, which are shown in the absence of any applied external force(s).
Figure 5:
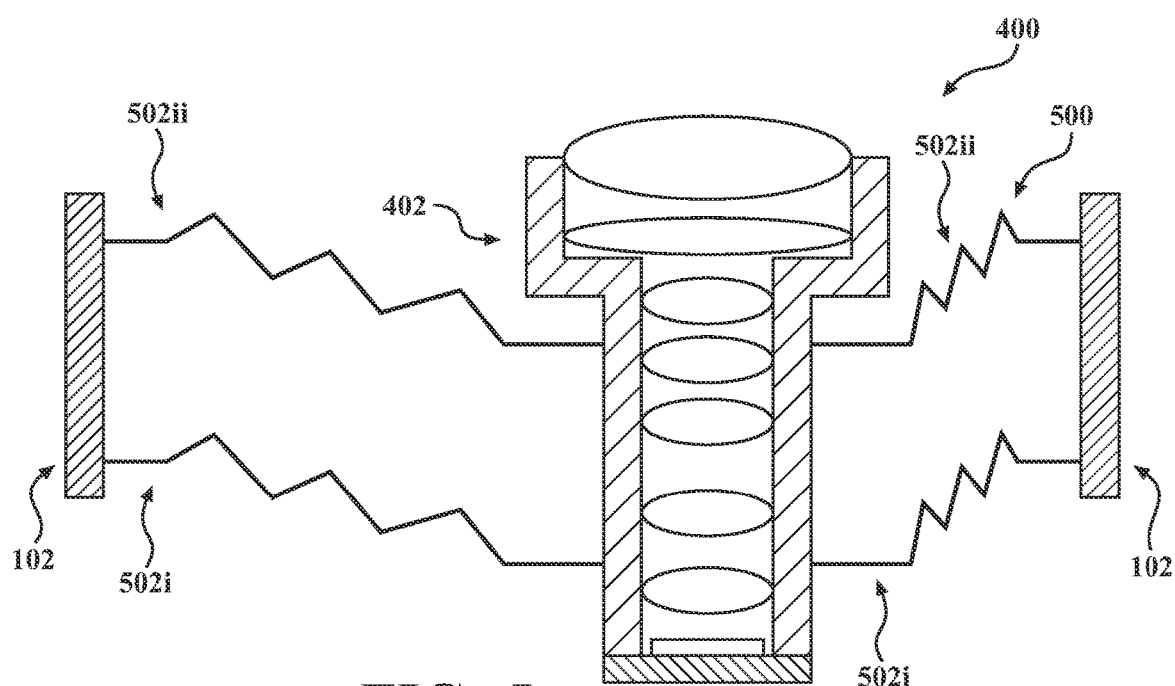
FIG. 5 is a schematic, cross-sectional view of the optical module and the isolation assembly seen in FIG. 4 upon the application of external force(s).

Referring now to FIGS. 4 and 5, an optical module 400 is illustrated that is configured for use in the image capture device 100 (FIGS. 1A, 1B), which is shown with one embodiment of an isolation assembly 500. More specifically, FIG. 4 provides a schematic, cross-sectional view of the optical module 400 and the isolation assembly 500 in the absence of any applied external force(s) and FIG. 5 provides a schematic, cross-sectional view of the optical module 400 and the isolation assembly 500 upon the application of external force(s) to the image capture device 100. Although shown in connection with the image capture device 100, it should be appreciated that the optical module 400 and the isolation assembly 500 may be configured for use with any suitable image capture device (e.g., the image capture device 200 (FIGS. 2A, 2B), the image capture device 300 (FIG. 3), etc.). Additionally, while the various image capture devices 100, 200, 300 described herein are generally illustrated as (digital) cameras, it should be appreciated that the principles of the present disclosure are applicable to a wide variety of use cases and form factors including, for example, various image capture devices that are configured for use in mobile devices (e.g., cell phones, tablets, laptops etc.), vehicles, security apparel (e.g., vests), etc.

The optical module 400 is positioned within the body 102 (FIGS. 1A, 4, 5) of the image capture device 100 and is configured as an integrated sensor-lens assembly (ISLA) 402. The optical module 400 (e.g. the ISLA 402) defines an optical axis X1 and includes: a (single) lens assembly (stack) 404 with a lens barrel 406 having opposite (front and rear) ends 408, 410; one or more lens elements 412 that are accommodated within (received, housed by) the lens barrel 406; a printed circuit board (PCB) 414 that is supported by (e.g., is connected to) the end 410 of the lens barrel 406; and an image sensor 416 that is supported by (e.g., is connected to) the PCB 414 (e.g., such that the image sensor 416 is accommodated within (received, housed by) the lens barrel 406).

While the optical module 400 is illustrated as including seven lens elements 412$i$-412$vii$ having a variety of different configurations in FIGS. 4 and 5, it should be appreciated that the particular number and/or configuration of the lens elements 412 included in the optical module 400 may be varied in alternate embodiments without departing from the scope of the present disclosure. For example, the present disclosure envisions embodiments in which the optical module 400 may include greater and fewer numbers of lens elements 412, as well as embodiments in which the lens elements 412 included in the optical module 400 may be identical in configuration.

The isolation assembly 500 supports (suspends) the optical module 400 within, and operatively connects the optical module 400 to, the body 102 of the image capture device 100. The isolation assembly 500 facilitates resilient displacement (movement) of the optical module 400 within the image capture device 100 (e.g., in relation to the body 102) upon the application of one or more external forces thereto (e.g., in the event that the image capture device 100 is dropped, stuck by an object, etc.). More specifically, upon the application of external force(s) to the image capture device 100, the optical module 400 is displaced (moved) from a normal (first) position (FIG. 4) into a deflected (second) position (FIG. 5). Thereafter, the optical module 400 oscillates within the body 102 as the vibration, shock, etc., is dissipated and absorbed, during which, the optical module 400 (automatically) returns to the normal position. The isolation assembly 500 thus isolates the optical module 400 from the body 102 so as to inhibit (if not entirely prevent) transmission of the external force(s) to the optical module 400, thereby protecting the lens element(s) 412, the PCB 414, the image sensor 416, and the connections therebetween, and guarding against unintended movement (e.g., shifting, dislocation) of the various components of the optical module 400.

The isolation assembly 500 includes one or more (at least one, a plurality of) compliant members 502 that extend between the optical module 400 and the body 102 of the image capture device 100. The compliant members 502 facilitate displacement (movement, oscillation) of the optical module 400 within the body 102 and are reconfigurable between a passive (initial) configuration (FIG. 4), which corresponds to the normal position of the optical module 400, and an active (subsequent) configuration (FIG. 5), which corresponds to the deflected position of the optical module 400. More specifically, reconfiguration of the compliant members 502 allows the ISLA 402 to move independently of the body 102 of the image capture device 100 under the influence of the external force(s) in one or more directions (e.g., along one or more of the X, Y, Z, rotX, rotY, and/rotZ axes (FIG. 1A)) during absorption and dissipation of the external force(s).

In the embodiment illustrated, the isolation assembly 500 includes one or more (at least one, a plurality of) (first) compliant members 502$i$ and one or more (at least one, a plurality of) (second) compliant members 502$ii$, which are spaced axially from each other along the optical axis X1. It should be appreciated, however, that the particular number of compliant members 502 may be varied without departing from the scope of the present disclosure. As such, embodiments including both greater and fewer numbers of compliant members 502 are envisioned herein including, for example, an embodiment in which the isolation assembly 500 includes a single compliant member 502.

It is envisioned that the compliant members 502 may include (e.g., may be formed from) any resilient (e.g., flexible, compliant, compressible) material or combination of resilient materials, and may be configured in any manner suitable for the intended purpose of facilitating reconfiguration between the passive and active configurations. For example, in the embodiment illustrated in FIGS. 4 and 5, the compliant members 502 are configured as springs 504 (e.g., wire form springs, coil springs, etc.) and include (e.g., are formed partially or entirely from) one or more metallic materials (e.g., steel, titanium, etc.). Embodiments are also envisioned, however, in which the configuration of the compliant members 502 and/or the material(s) of construction used in the fabrication thereof may be varied, as elaborated upon below.

In the embodiment illustrated in FIGS. 4 and 5, the compliant members 502 are configured to deliver uniform compliance in each of the directions identified above. Embodiments are also envisioned, however, in which the compliant members 502 may be configured to deliver non-uniform compliance. For example, depending upon spatial constraints within the body 102 of the image capture device 100, the desired performance of the optical module 400 under the influence of the external force(s), the anticipated magnitude of the external force(s), etc., it is envisioned that compliance in a first direction (along a first axis) may exceed compliance in a second direction (along a second axis), which may be achieved by varying the particular configuration of the compliant members 502, the material(s) of construction thereof, etc. For example, it is envisioned that compliance along the Y-axis (FIG. 1A) may exceed compliance along the X-axis and/or the Z-axis in order avoid contact between the optical module 400 and the remaining internal components of the image capture device 100.

In the embodiment illustrated in FIGS. 4 and 5, the isolation assembly 500 is configured such that a midline (centerline) MI thereof is (generally) aligned with a midline (centerline) MO of the optical module 400, which reduces sweep of the optical module 400 during displacement (movement, oscillation) within the body 102 of the image capture device 100. Embodiments are also envisioned, however, in which the isolation assembly 500 may be configured such that the midline MI thereof is offset from (e.g., is out of (general) alignment with) the midline MO of the optical module 400. For example, embodiments are envisioned in which the isolation assembly 500 may be configured such that the midline MI is positioned closer to the end 408 the lens barrel 406, as are embodiments in which the isolation assembly 500 may be configured such that the midline MI is positioned closer to the end 410 of the lens barrel 406.

Figure 6:
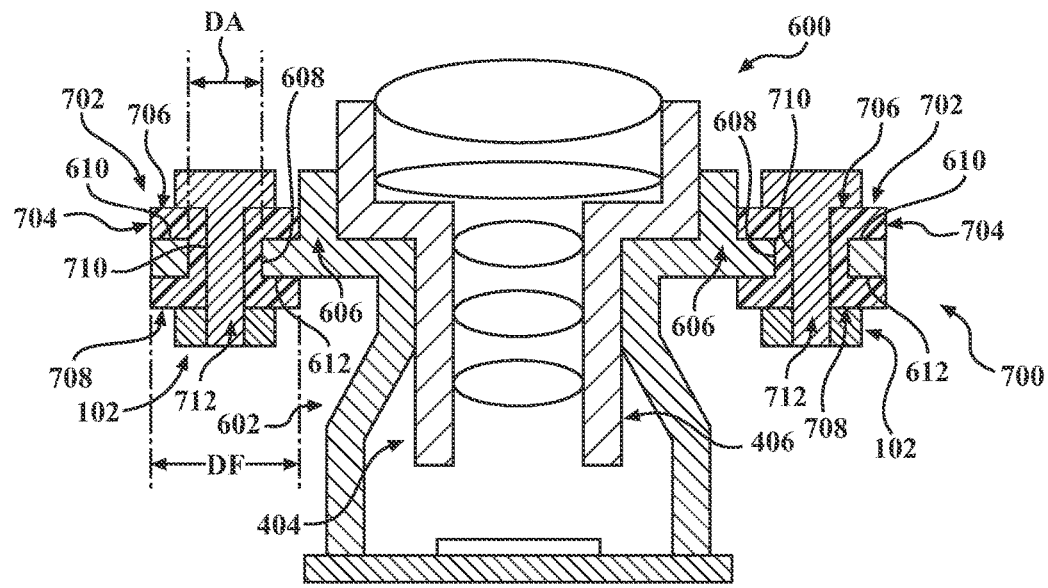
FIG. 6 provides a schematic, cross-sectional view of alternate embodiments of the optical module and the isolation assembly.

With reference now to FIG. 6, an optical module 600 and an isolation assembly 700 will be discussed. More specifically, FIG. 6 provides a schematic, cross-sectional view of the optical module 600 and the isolation assembly 700. The optical module 600 and the isolation assembly 700 are substantially similar to the optical module 400 and the isolation assembly 500 (FIGS. 4, 5), respectively, and, accordingly, will only be discussed with respect to any differences therefrom in the interest of brevity. As such, identical reference characters will be utilized to refer to elements, structures, features, etc., common to the optical modules 400, 600 and the isolation assemblies 500, 700.

In addition to the lens assembly 404, the optical module 600 includes a lens mount 602, which receives and supports the lens assembly 404 and is located between the lens barrel 406 and the body 102 of the image capture device 100. The lens mount 602 includes a main body 604 and a pair of arms 606 that extend outwardly from the main body 604, each of which includes an aperture 608 that defines a transverse cross-sectional dimension DA (e.g., a diameter). As described in further detail below, the apertures 608 allow the lens mount 602 to interface with (support) the isolation assembly 700. More specifically, the arms 606 receive the isolation assembly 700 (via the apertures 608) such that the isolation assembly 700 is positioned between the optical module 600 and the body 102 of the image capture device 100.

While the lens barrel 406 and the lens mount 602 are illustrated as separate, discrete components of the optical module 600 in the embodiment seen in FIG. 6, embodiments are also envisioned in which the lens barrel 406 and the lens mount 602 may be integrally (e.g., unitarily, monolithically) formed such that the lens barrel 406 and the lens mount 602 are incorporated into a single unit.

The isolation assembly 700 includes compliant members 702 that are configured as bushings 704, which may include any resilient (e.g., flexible, compliant, compressible) material or combination of materials suitable for the intended purpose of facilitating resilient, multi-directional displacement (movement, oscillation) of the optical module 600 within the image capture device 100 (e.g., in relation to the body 102) under the influence of applied external force(s) in the manner discussed above with respect to the optical module 400 (FIGS. 4, 5). For example, it is envisioned that the bushings 704 may include (e.g., may be formed partially or entirely from) one or more rubbers, elastomers, foams, etc.

It is envisioned that the material(s) of construction used in fabrication of the bushings 704 may have any suitable durometer. For example, in circumstances or environments in which the image capture device 100 (FIGS. 1A, 1B) may be subjected to larger external force(s), it is envisioned that the bushings 704 may include (e.g., may be formed partially or entirely from) harder material(s) having a higher durometer within the range of approximately 60D to approximately 100D. In circumstances or environments in which the image capture device 100 may be subjected to smaller external force(s), however, it is envisioned that the bushings 704 may include (e.g., may be formed partially or entirely from) softer material(s) having a lower durometer within the range of approximately 10D to approximately 50D.

The bushings 704 are received by (positioned within) apertures 608 defined by the arms 606 so as to separate the optical module 600 from the body 102 of the image capture device 100. The bushings 704 include respective first and second (front and rear) flanges 706, 708 as well as a channel 710 that extends therethrough. The flanges 706, 708 engage (contact) opposing (front and rear) faces 610, 612 of the arms 606 and each define a transverse cross-sectional dimension DF (e.g., a diameter) that exceeds the transverse cross-sectional dimension DA defined by the apertures 608, which allows the bushings 704 to be fixedly received by the arms 606 and secured within the apertures 608. The channels 710 are configured to receive mechanical fasteners 712 (e.g., pins, screws, rivets, clips, etc.) such that the mechanical fasteners 712 extend through the arms 606 (via the bushings 704) and into the body 102, thereby indirectly (operatively)

connecting the optical module 600 to the image capture device 100 with the compliant members 702 (e.g., the bushings 704) positioned therebetween. Positioning of the compliant members 702 between the optical module 600 and the body 102 of the image capture device 100 facilitates absorption and dissipation of the external force(s) and, thus, isolation of the optical module 600 from the body 102 of the image capture device 100.

Figure 7:
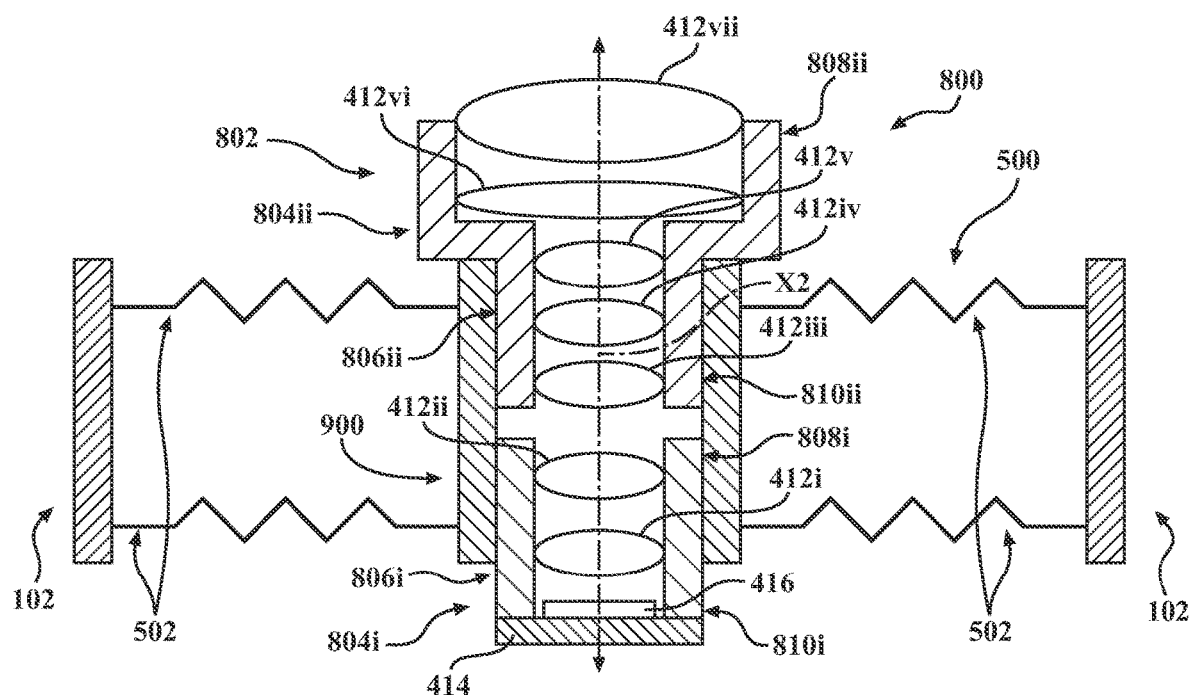
FIG. 7 provides a schematic, cross-sectional view of an alternate embodiment of the optical module, which is shown with the isolation assembly seen in FIGS. 4 and 5 and a mounting member that is located therebetween.

With reference now to FIG. 7, an optical module 800 will be discussed. More specifically, FIG. 7 provides a schematic, cross-sectional view of the optical module 800, which is shown with the isolation assembly 500. The optical module 800 is substantially similar to the optical modules 400 (FIGS. 4, 5), 600 (FIG. 6) and, accordingly, will only be discussed with respect to any differences therefrom in the interest of brevity. As such, identical reference characters will be utilized to refer to elements, structures, features, etc., common to the optical modules 400, 600, 800.

The optical module 800 includes: an ISLA 802 having a (first, primary, mother) lens assembly 804i with a (first) lens barrel 806i having opposite (front and rear) ends 808i, 810i, and a (second, ancillary, daughter) lens assembly 804ii with a (second) lens barrel 806ii having opposite (front and rear) ends 808ii, 810ii. As such, in contrast to the optical modules 400, 600, the optical module 800 includes a plurality of lens assemblies 804.

In addition to the lens barrel 806i, the ISLA 802 includes the aforementioned PCB 414, which is supported by (e.g., is connected to) the end 810i of the lens barrel 806i, and the aforementioned image sensor 416, which is supported by (e.g., is connected to) the PCB 414 (e.g., such that the image sensor 416 is accommodated within (received, housed by) the lens barrel 806i). The lens assembly 804i is spaced axially from the lens assembly 804ii along an optical axis X2 defined by the optical module 800 (e.g., by the ISLA 802) and is positioned forwardly thereof (e.g., closer to the front surface 102f (FIG. 1A) of the body 102).

Each of the lens assemblies 804i, 804ii includes one or more of the lens elements 412. More specifically, in the embodiment illustrated, the optical module 800 includes seven lens elements 412i-412vii, wherein the lens elements 412i, 412ii are provided as components of the lens assembly 804i and the lens elements 412iii-412vii are provided as components of the lens assembly 804ii. It should be appreciated, however, that the particular number and/or configuration of the lens elements 412 included in the lens assemblies 804i, 804ii may be varied in alternate embodiments without departing from the scope of the present disclosure. For example, the present disclosure envisions embodiments in which the lens assembly 804i may include a greater number of lens elements 412 than the lens assembly 804ii, as well as embodiments in which the lens elements 412 included in the lens assemblies 804i, 804ii may be identical in configuration.

In contrast to optical module 400 (FIGS. 4, 5) and the optical module 600 (FIG. 6), which are directly connected to the body 102 of the image capture device 100 by the respective isolation assemblies 500, 700, the optical module 800 is indirectly (operatively) connected to the isolation assembly 500 is via a mounting member 900 (e.g., a brace, a bridge, or the like) included in the image capture device 100, which is located (positioned) between the optical module 800 and the isolation assembly 500.

The mounting member 900 extends between and fixedly connects the lens assemblies 804i, 804ii. The mounting member 900 thus fixes the lens assemblies 804i, 804ii in relation to each other so as to inhibit (if not entirely prevent) relative movement between the lens assemblies 804i, 804ii. As a result, the isolation assembly 500 dependently supports (suspends) the lens assemblies 804i, 804ii within the body 102 of the image capture device 100 (FIGS. 1A, 1B), which results in resilient and simultaneous displacement (movement, oscillation) of the lens assemblies 804i, 804ii within the image capture device 100 (e.g., in relation to the body 102) upon the application of external force(s) to the image capture device 100 such that the ISLA 802 moves as a single unit.

It is envisioned that the mounting member 900 and the lens barrels 806i, 806ii may be connected (secured) together in any suitable manner. For example, in the embodiment illustrated in FIG. 7, the mounting member 900 and the lens barrels 806i, 806ii are configured as separate, discrete components of the optical module 800 that are connected via an adhesive, via one or more mechanical connections (e.g., pins, screws, rivets, clips, etc.), or the like. Alternatively, it is envisioned that the mounting member 900 and the lens barrels 806i, 806ii may be integrally (e.g., unitarily, monolithically) formed such that the mounting member 900 and the lens barrels 806i, 806ii are incorporated into a single unit.

In the embodiment illustrated, the mounting member 900 is (generally) cylindrical in configuration and is fixedly (non-removably) connected to the isolation assembly 500. It should be appreciated that the particular configuration of the mounting member 900 and/or the structural relationship between the mounting member 900 and the isolation assembly 500 may be varied in alternate embodiments without departing from the scope of the present disclosure (e.g., depending upon spatial constraints within the body 102 of the image capture device 100, the desired performance of the optical module 800 under the influence of the external force(s), the anticipated magnitude of the external force(s), the configurations of the lens assemblies 804, 804ii, the configuration of the body 102, etc.). For example, the present disclosure envisions embodiments in which the mounting member 900 and the isolation assembly 500 may be removably (non-fixedly) connected together.

Figure 8:
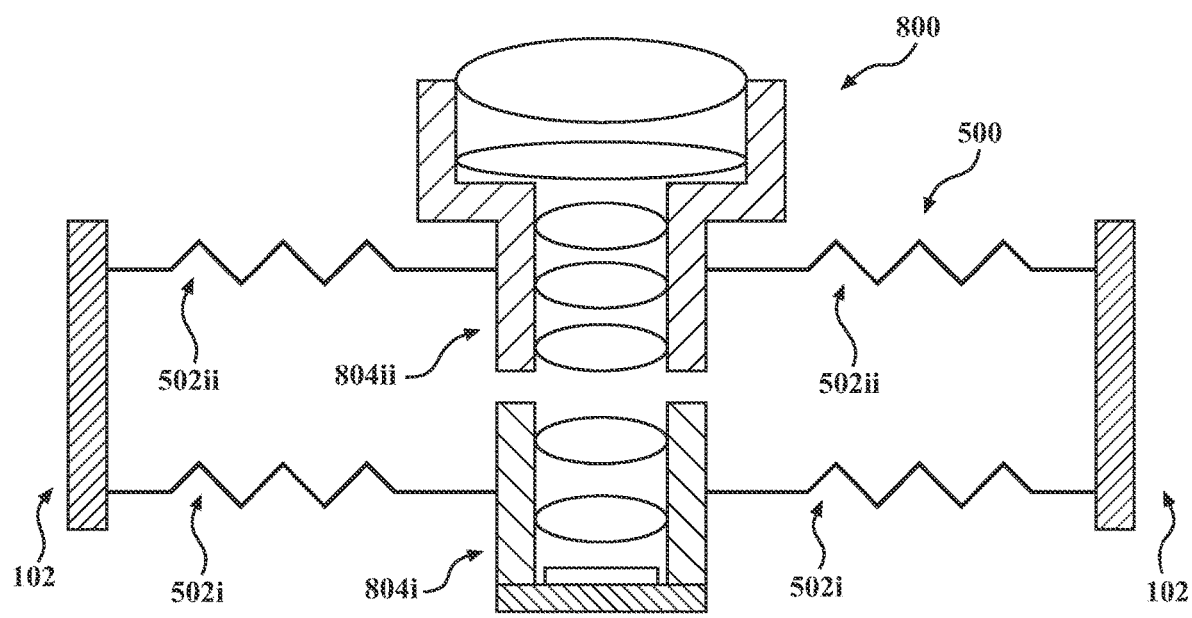
FIG. 8 provides a schematic, cross-sectional view of the optical module and the isolation assembly with the mounting member seen in FIG. 7 omitted.

FIG. 8 provides a schematic, cross-sectional view of an alternate embodiment of the present disclosure, which is devoid of the mounting member 900 (FIG. 7). Omission of the mounting member 900 facilitates direct connection of the optical module 800 to the body 102 of the image capture device 100 via the isolation assembly 500. More specifically, in the illustrated embodiment, the compliant member(s) 502i extend between and connect the lens assembly 804i to the body 102 of the image capture device 100 and the compliant member(s) 502ii extend between and connect the lens assembly 804ii to the body 102 of the image capture device 100, whereby the isolation assembly 500 independently supports (suspends) the lens assemblies 804i, 804ii within the image capture device 100 (FIGS. 1A, 1B). As such, upon the application of external force(s) to the image capture device 100, the lens assemblies 804i, 804ii are resiliently displaced (moved) and oscillate within the image capture device 100 in relation to each other and in relation to the body 102.

Figure 9:
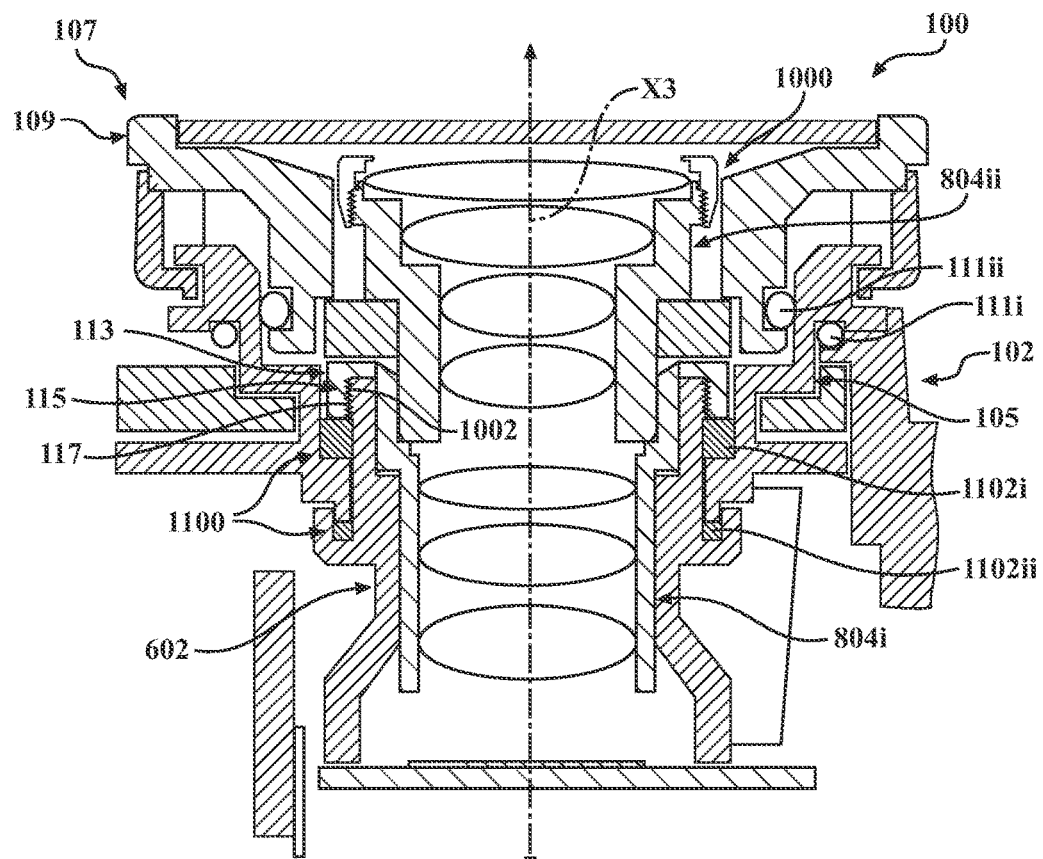
FIG. 9 provides a schematic, cross-sectional view of alternate embodiments of the optical module and the isolation assembly.

With reference now to FIG. 9, an optical module 1000 and an isolation assembly 1100 will be discussed. More specifically, FIG. 9 provides a schematic, cross-sectional view of the optical module 1000 and the isolation assembly 1100 positioned within the image capture device 100. The optical module 1000 and the isolation assembly 1100 are substantially similar to the optical modules 400 (FIGS. 4, 5), 600 (FIG. 6), 800 (FIGS. 7, 8) and the isolation assemblies 500

(FIGS. 4, 5, 7, 8), 700 (FIG. 6) and, accordingly, will only be discussed with respect to any differences therefrom in the interest of brevity. As such, identical reference characters will be utilized to refer to elements, structures, features, etc., common to the optical modules 400, 600, 800, 1000 and the isolation assemblies 500, 700, 1100.

The optical module 1000 includes the aforementioned lens assemblies 804i, 804ii, which are fixed in relation to each other so as to inhibit (if not entirely prevent) relative movement therebetween and collectively define an optical axis X3. It is envisioned that that the lens assemblies 804i, 804ii may be fixedly connected together in any suitable manner. For example, it is envisioned that the lens assemblies 804i, 804ii may be connected via an adhesive, via one or more mechanical connections (e.g., pins, screws, rivets, clips, etc.), or via the aforedescribed mounting member 900 (FIG. 7). As a result, the lens assemblies 804i, 804ii are dependently supported (suspended) within the body 102 of the image capture device 100 by the isolation assembly 1100 such that the lens assemblies 804i, 804ii are resiliently and simultaneously displaced (moved) within the image capture device 100 (e.g., in relation to the body 102) and oscillate in tandem as a single unit upon the application of external force(s) to the image capture device 100.

In the embodiment illustrated, the image capture device 100 includes a bayonet 105 that is fixedly connected to the body 102 of the image capture device 100. The bayonet 105 is configured to releasably support a cover 107 (e.g., a removable cover lens 109) such that the cover 107 overlies the optical module 1000.

In order to inhibit (if not entirely prevent) the entry of water, debris, etc., the image capture device 100 includes one or more sealing members 111. More specifically, in the embodiment illustrated, the image capture device 100 includes a (first) sealing member 111i that is located (positioned) between the body 102 and the bayonet 105 and a (second) sealing member 111ii that is located (positioned) between the bayonet 105 and the cover 107.

The optical module 1000 extends into and through the bayonet 105, which allows for positioning of the cover 107 in adjacent relation to the lens assembly 804ii. More specifically, the bayonet 105 is configured to receive the optical module 1000 (e.g., the lens mount 602) in an interference fit (e.g., a press-fit, a pressure fit). To facilitate and maintain proper positioning of the optical module 1000 within the body 102 of the image capture device 100, the image capture device 100 includes a locking member 113 (e.g., a locking ring 115). The locking member 113 is located (positioned) within the bayonet 105 and is threadably connected to the optical module 1000 (e.g., the lens assembly 804i). More specifically, the locking member 113 and the lens assembly 804i (e.g., the lens mount 602) include corresponding threaded portions 117, 1002, which allows for precise adjustment in the relative positions of the locking member 113 and the lens assembly 804i.

The isolation assembly 1100 allows for (dependent) displacement (movement) of the lens assemblies 804i, 804ii within the image capture device 100 (e.g., in relation to the body 102, the bayonet 105, etc.) upon the application of external force(s) thereto and, thus, isolates the lens assemblies 804i, 804ii, as discussed above in connection with the preceding embodiments. The isolation assembly 1100 is located (positioned) between the optical module 1000 (e.g., the lens assembly 804i), the bayonet 105, and the locking member 113, and thereby separates the lens assembly 804ii from the body 102 of the image capture device 100 (via the lens assembly 804i). As a result, relative rotation between the locking member 113 and the lens mount 602 results in compression of the isolation assembly 1100, which increases compliance and facilitates multi-directional force absorption. More specifically, relative rotation between the locking member 113 and the lens mount 602 causes movement of the lens assembly 804i along the optical axis X3, which compresses the isolation assembly 1100 between the locking member 113 and the bayonet 105.

In the embodiment illustrated, the isolation assembly 1100 includes one or more (at least one, a plurality of) (first) compliant members 1102i and one or more (at least one, a plurality of) (second) compliant members 1102ii. The compliant member(s) 1102i are located (positioned) between the optical module 1000 (e.g., the lens assembly 804i), the bayonet 105, and the locking member 113, and the compliant member(s) 1102ii are located (positioned) rearwardly thereof (e.g., further from the front surface 102f (FIG. 1A) of the body 102) between the lens mount 602 and the bayonet 105, which provides for additional force absorption along the optical axis X3 and, thus, increased compliance. Embodiments of the optical module 1000 that are devoid of the compliant member(s) 1102ii, however, are also envisioned herein and would not be beyond the scope of the present disclosure. The particular configuration of the isolation assembly 1100 may, thus, be customized in correspondence with the configuration of the image capture device 100, the optical module 1000, etc.

It is envisioned that the complaint member(s) 1102 may include any suitable configuration(s), whether identical or non-identical. For example, depending upon spatial constraints within the body 102 of the image capture device 100, the desired performance of the optical module 1000 under the influence of the external force(s), the anticipated magnitude of the external force(s), etc., it is envisioned that the compliant member(s) 1102 may include bushings, washers, gaskets, or the like, and that the compliant member(s) 1102 may be either linear or non-linear (e.g., arcuate, toroidal, etc.) in configuration.

In certain embodiments, it is envisioned that the optical module 1000 may be configured so as to include air gaps between the lens mount 602 and the bayonet 105 and thereby increase compliance along the optical axis X3. Such air gaps may be provided in addition to, or instead of, the compliant member(s) 1102i and/or the compliant member(s) 1102ii.

Figure 10:
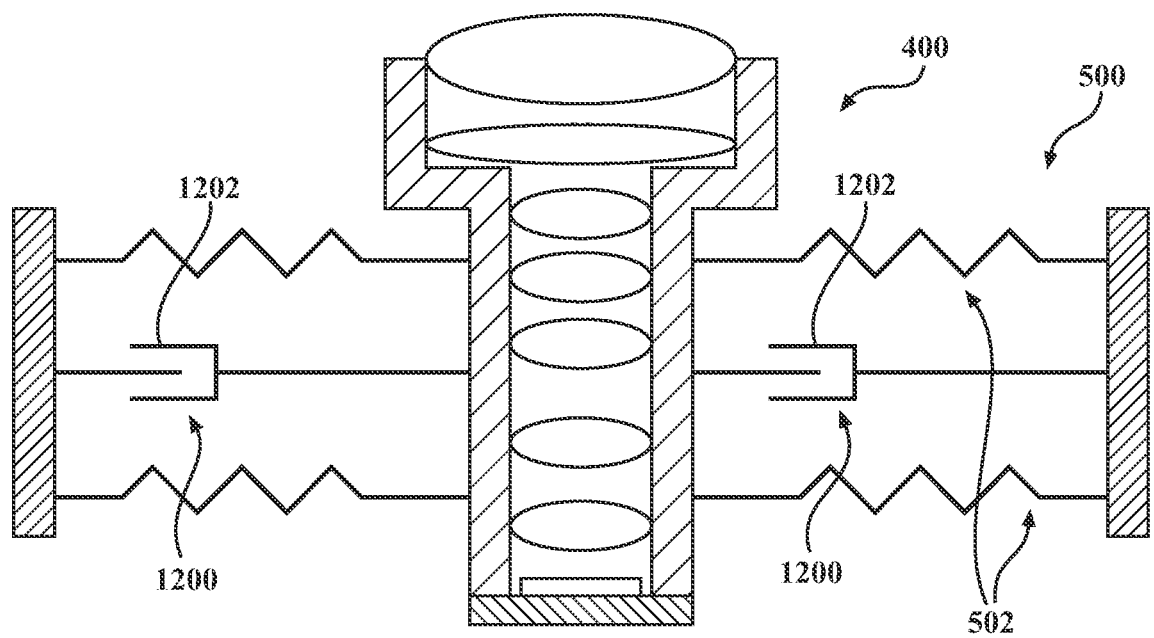
FIG. 10 provides a schematic, cross-sectional view of the optical module and the isolation assembly seen in FIGS. 4 and 5 according to an alternate embodiment of the present disclosure in which the isolation assembly includes a (spring) mass damper system.

In order to facilitate additional adjustments in the performance of, and/or the compliance provided by, the various isolations assemblies described herein, it is envisioned that a (spring) mass damper system may be included to alter displacement (movement) of the corresponding optical module within the body 102 of the image capture device 100. For example, FIG. 10 provides a schematic, cross-sectional view of the optical module 400 (FIGS. 4, 5) and the isolation assembly 500 according to an alternate embodiment of the present disclosure in which the isolation assembly 500 includes (spring) mass damper system 1200. The mass damper system 1200 includes one or more (at least one, a plurality of) dampers (stabilizers) 1202 that are supported by (or otherwise connected to) the compliant member(s) 502. The damper(s) 1202 are configured to dissipate energy released by the compliant member(s) 502 during the oscillation of the optical module 400 resulting from the application of external force(s) to the image capture device 100 and, thus, reduce the number and/or the amplitude of the oscillations so as to stabilize the optical module 400 within the body 102.

Although illustrated in connection with the optical module 400 and the isolation assembly 500, it should be appreciated that the mass damper system 1200 may be incorporated into any suitable embodiment described herein.

Figure 11:
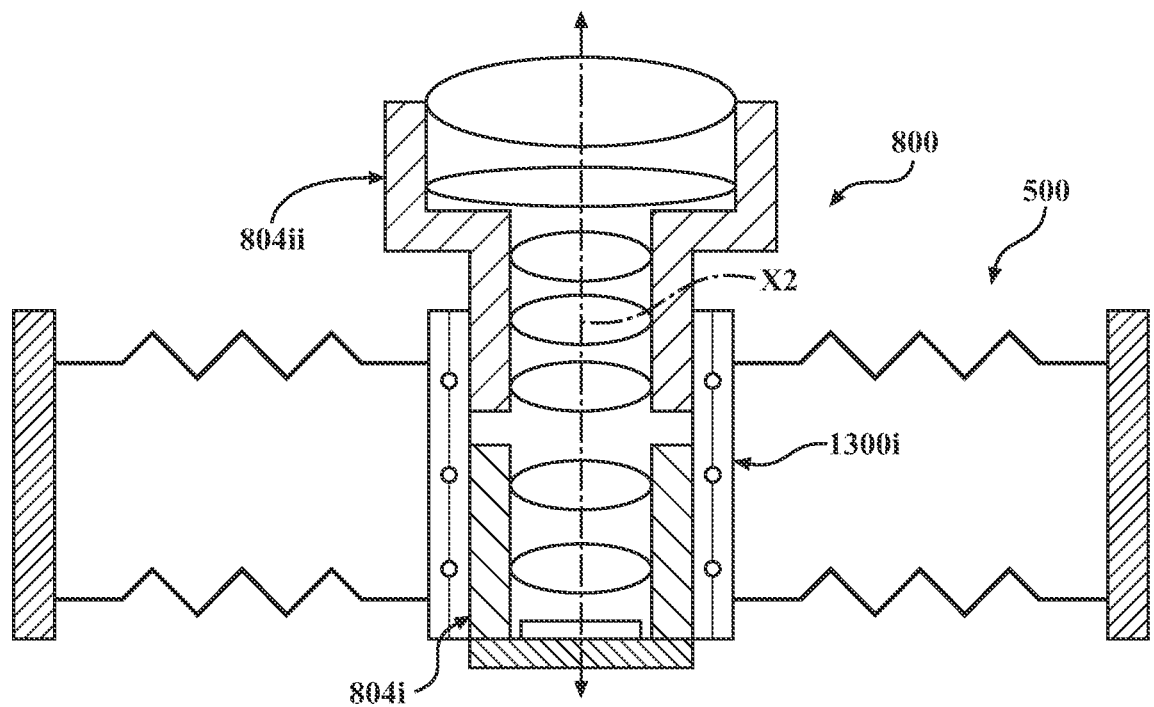
FIG. 11 provides a schematic, cross-sectional view of the optical module and the isolation assembly seen in FIGS. 7 and 8 according to an alternate embodiment of the present disclosure in which the optical module includes a (first) actuator.

Additionally, or alternatively, it is envisioned that the various optical modules described herein may include one or more (at least one, a plurality of) actuators that are configured to facilitate reconfiguration thereof. For example, FIG. 11 provides a schematic, cross-sectional view of the optical module 800 and the isolation assembly 500 according to an alternate embodiment of the present disclosure in which the optical module 800 includes a (first) actuator 1300i that is configured to facilitate repositioning (movement, displacement) of one or more components of the optical module 800, independently of any applied external force(s), and thereby reconfigure the optical module 800. More specifically, in the embodiment illustrated, the actuator 1300i is located (positioned) between isolation assembly 500 and the lens assemblies 804i, 804ii. The actuator 1300i is connected to the lens assemblies 804i, 804ii and is configured to vary the relative positions of the lens assemblies 804i, 804ii along the optical axis X2 upon actuation by increasing or decreasing the axial spacing therebetween.

Figure 12:
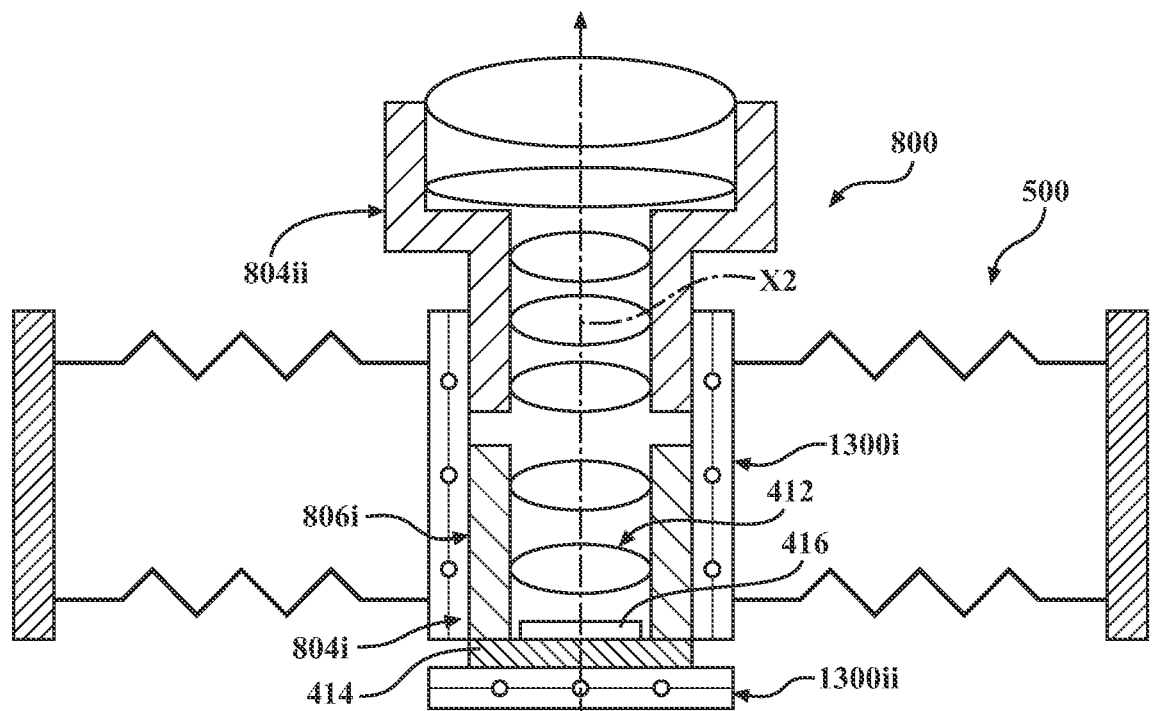
FIG. 12 provides a schematic, cross-sectional view of the optical module and the isolation assembly seen in FIG. 11 according to an alternate embodiment of the present disclosure in which the optical module further includes a (second) actuator.

FIG. 12 provides a schematic, cross-sectional view of the optical module 800 and the isolation assembly 500 according to another embodiment of the present disclosure in which the optical module 800 further includes a (second) actuator 1300ii. The actuator 1300ii is configured to vary the axial position of the PCB 414 along the optical axis X2 to increase or decrease axial spacing between the PCB 414 and the lens barrel 806i and, thus, axial spacing between the image sensor 416 and the lens element(s) 412. More specifically, the actuator 1300ii is connected to the PCB 414 and is located externally of the optical module 800 (e.g., the lens assembly 804i).

Figure 13:
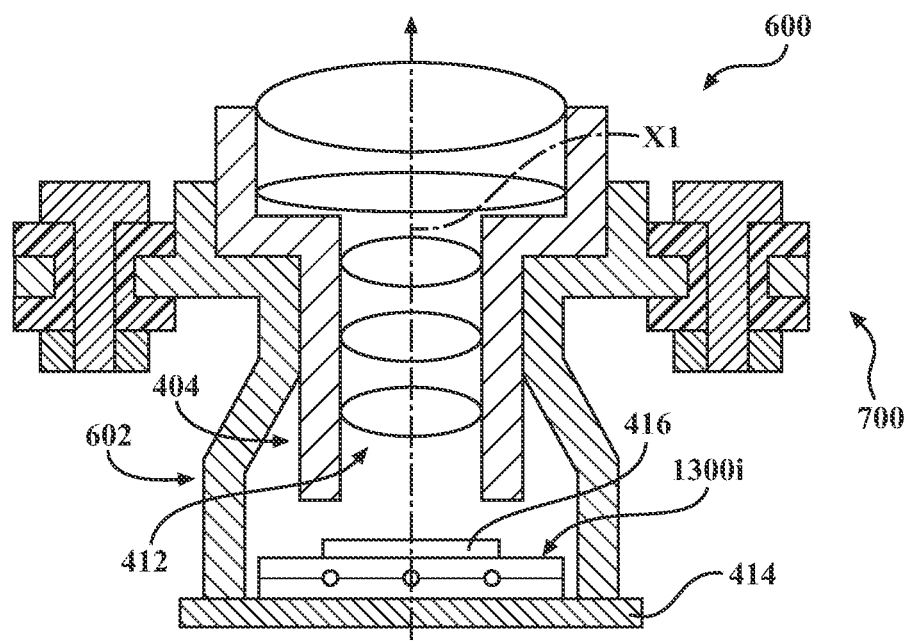
FIG. 13 provides a schematic, cross-sectional view of the optical module and the isolation assembly seen in FIG. 6 according to an alternate embodiment of the present disclosure in which the optical module includes a (first) actuator.

FIG. 13 provides a schematic, cross-sectional view of the optical module 600 and the isolation assembly 700 according to an alternate embodiment of the present disclosure in which the (first) actuator 1300i is connected to the PCB 414 and is located internally within the optical module 600 such that the actuator 1300i is disconnected from the isolation assembly 700. More specifically, the actuator 1300i is located (positioned) between the PCB 414 and the image sensor 416 and is configured to vary the axial position of the image sensor 416 along the optical axis X1 to increase or decrease axial spacing between the PCB 414 and the image sensor 416 and, thus, axial spacing between the image sensor 416 and the lens element(s) 412.

Figure 14:
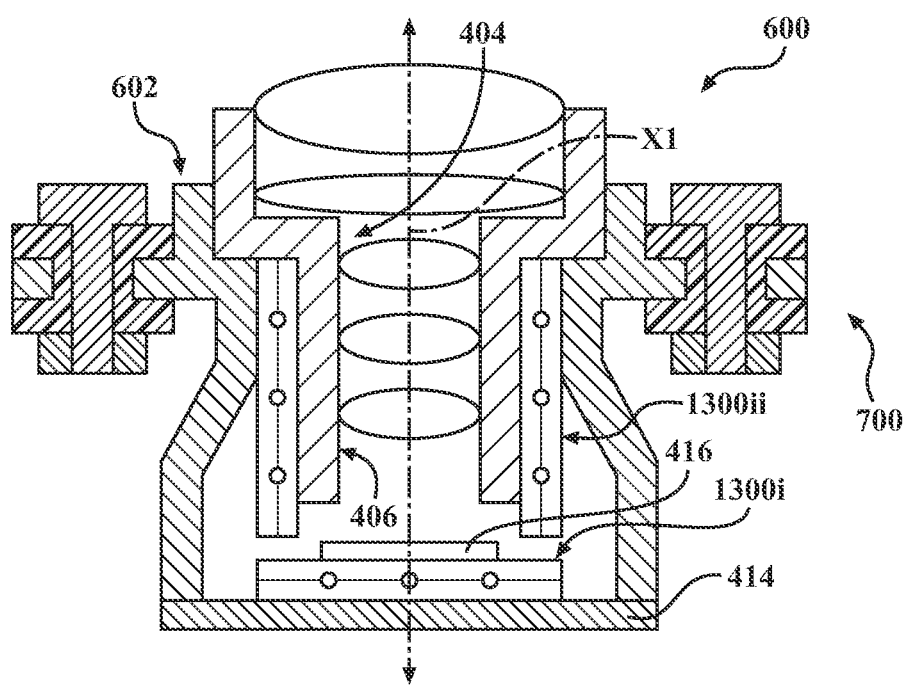
FIG. 14 provides a schematic, cross-sectional view of the optical module and the isolation assembly seen in FIG. 13 according to an alternate embodiment of the present disclosure in which the optical module further includes a (second) actuator.

FIG. 14 provides a schematic, cross-sectional view of the optical module 600 and the isolation assembly 700 according to another embodiment of the present disclosure in which the optical module 600 further includes the (second) actuator 1300ii, which is located (positioned) between the lens mount 602 and the lens barrel 406. The actuator 1300ii is configured to vary the axial position of the lens barrel 406 within the lens mount 602 along the optical axis X1 and, thus, facilitates additional increased or decreased axial spacing between the image sensor 416 and the lens element(s) 412.

With reference now to FIGS. 4-8, use and operation of the various optical modules 400, 600, 800 will be discussed in connection with various methods of reducing the transmission of external force(s) thereto.

FIGS. 4 and 6, for example, illustrate methods of reducing the transmission of external force(s) to the respective optical modules 400, 600, each of which includes a single lens assembly (e.g., the lens barrel 406). The illustrated methods include indirectly (operatively) connecting the optical modules 400, 600 to the body 102 of the image capture device 100 via the respective isolation assemblies 500, 700 such that the optical modules 400, 600 are movable in relation to the body 102 under the influence of the external force(s) applied to the image capture device 100. More specifically, connecting the optical modules 400, 600 to the body 102 includes supporting (suspending) the lens assembly 404 and the lens mount 602 via the respective compliant member(s) 502, 702, which extend between the optical modules 400, 600 and the body 102.

By contrast, FIGS. 7 and 8 illustrate various methods of reducing the transmission of external force(s) to the optical module 800, which includes multiple lens assemblies (e.g., the lens assemblies 804i, 804ii). More specifically, the method illustrated in FIG. 7 includes operatively connecting the optical module 800 to the body 102 such that the lens assemblies 804i, 804ii are dependently and indirectly supported (suspended) via the compliant member(s) 502. More specifically, as discussed above, in the embodiment illustrated in FIG. 7, the complaint member(s) 502 extend between and are connected to the body 102 and the mounting member 900, whereby the mounting member 900 physically separates the compliant member(s) 502 from the optical module 800. In the embodiment illustrated in FIG. 8, however, the method includes operatively connecting the optical module 800 to the body 102 such that the lens assemblies 804i, 804ii are independently and directly supported (suspended) via the compliant members 502.

In certain embodiments, reducing force transmission to the optical module (e.g., the optical module 400) may include damping the corresponding isolation assembly (e.g., the isolation assembly 500). For example, in the method illustrated in FIG. 10, operatively connecting the optical module 400 to the body 102 include damping the isolation assembly 500 via the dampers 1202 in order to reduce oscillation of the optical module 400.

Additionally, or alternatively, the methods described herein may include reconfiguring the optical modules (e.g., the optical modules 600, 800 (FIGS. 11-14)) by repositioning one or more components thereof. For example, it is envisioned that reconfiguring the optical modules 600, 800 may include varying the relative positions of the lens assemblies 804i, 804ii (FIGS. 11, 12) along the optical axis X2, varying the axial position of the PCB 414 (FIG. 12) along the optical axis X2 to increase or decrease axial spacing between the PCB 414 and the lens assembly 804i, varying the axial position of the image sensor 416 (FIGS. 13, 14) along the optical axis X1 to increase or decrease axial spacing between the PCB 414 and the image sensor 416 and, thus, axial spacing between the image sensor 416 and the lens assembly 404, or varying the axial position of the lens barrel 406 within the lens mount 602 (FIG. 14) along the optical axis X1.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of 25% (e.g., to allow for manufacturing tolerances and/or deviations in design). For example, the term "generally parallel" should be understood as referring to an arrangement in which the pertinent components (structures, elements) subtend an angle therebetween that is equal to 180° as well as an arrangement in which the pertinent components (structures, elements) subtend an angle therebetween that is greater than or less than 180° (e.g., +25%). The term "generally parallel" should thus be understood as encompassing configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An image capture device comprising:
a body defining an exterior surface of the image capture device;
an optical module positioned within the body and defining an optical axis; and
an isolation assembly supporting the optical module within the body and facilitating resilient displacement of the optical module in relation to the body upon application of an external force to the image capture device to thereby inhibit transmission of the external force to the optical module, wherein the isolation assembly includes at least one compliant member directly connected to the body.

2. The image capture device of claim 1, wherein the isolation assembly includes a damper configured to dissipate energy released by the isolation assembly and reduce oscillation of the optical module within the body.

3. The image capture device of claim 1, wherein the optical module includes at least one actuator configured to facilitate repositioning of one or more components thereof independently of the external force and thereby reconfigure the optical module.

4. The image capture device of claim 1, wherein the optical module includes a single lens assembly.

5. The image capture device of claim 1, wherein the optical module includes:
a first lens assembly; and
a second lens assembly spaced axially from the first lens assembly along the optical axis.

6. The image capture device of claim 5, wherein the first lens assembly and the second lens assembly are dependently supported by the isolation assembly.

7. The image capture device of claim 6, wherein the first lens assembly and the second lens assembly are fixedly connected such that the first lens assembly and the second lens assembly are displaced simultaneously within the body upon the application of the external force.

8. The image capture device of claim 7, further comprising a mounting member extending between and fixedly connecting the first lens assembly and the second lens assembly, the isolation assembly being connected to the mounting member.

9. The image capture device of claim 5, wherein the first lens assembly and the second lens assembly are independently supported by the isolation assembly.

10. The image capture device of claim 9, wherein the first lens assembly and the second lens assembly are movable in relation to each other and the body upon the application of the external force.

11. An image capture device comprising:
a body defining an exterior surface of the image capture device;
an optical module positioned within the body; and
at least one compliant member extending between the body and the optical module to thereby isolate the optical module from the body and absorb an external force applied to the image capture device, wherein the at least one compliant member includes:
a first end directly connected to the body; and
a second end directly connected to the optical module.

12. The image capture device of claim 11, wherein the at least one compliant member is resilient in construction such that the optical module can be displaced between a normal position and a deflected position upon application of the external force.

13. The image capture device of claim 12, wherein the at least one compliant member is configured as a spring.

14. The image capture device of claim 11, wherein the at least one compliant member is uniformly compliant in more than one direction.

15. The image capture device of claim 11, wherein the at least one compliant member is configured such that compliance in a first direction exceeds compliance in a second direction.

16. A method of reducing force transmission to an optical module in an image capture device, the method comprising operatively connecting the optical module to a body defining an exterior surface of the image capture device via an isolation assembly such that the optical module is movable in relation to the body upon an application of external force to the image capture device, wherein the isolation assembly includes at least one compliant member directly connected to the body.

17. The method of claim 16, wherein operatively connecting the optical module to the body of the image capture device includes supporting a single lens assembly via the at least one compliant member.

18. The method of claim 16, wherein operatively connecting the optical module to the body of the image capture device includes dependently supporting first and second lens assemblies via the at least one compliant member.

19. The method of claim 16, wherein operatively connecting the optical module to the body of the image capture device includes independently supporting first and second lens assemblies via the at least one compliant member.

20. The method of claim 16, further comprising damping the isolation assembly to thereby reduce oscillation of the optical module within the body.

* * * * *